2,742,371

CELLULOSE ESTERS AND ETHERS PLASTICIZED WITH 1.6 HEXANDIOL DI-2-ETHYL HEXOATE

Charles P. Albus and Richard E. Field, Easton, Pa., assignors to General Aniline & Film Corporation, New York, N. Y., a corporation of Delaware No Drawing. Application November 16, 1951, Serial No. 256,815

1 Claim. (Cl. 106—180)

This invention relates particularly to lower alkyl cellulose esters and ethers plasticized with di-2-ethyl hexanoic acid di-esters of 1,6-hexanediol.

In the preparation of cellulose esters for various uses, it is common practice in the art to modify them by the addition of materials having a plasticizing or softening action. It is a necessary requisite of these plasticizers that they be compatible over a fairly wide range, have good stability, low volatility, good resistance to oxidation or migration on aging, be resistant to the leaching action of water, and must not develop objectionable odors on standing.

If a plasticizer is not completely compatible in the proportions generally used with a cellulose ester, it will immediately exude from a cast film or molded article to give an opaque appearance and oily feel. Sometimes this occurs only after the molded article or cast film is allowed to stand for some time. In either case, the cellulose ester reverts to its original hardness and brittleness.

Low boiling plasticizers evaporate slowly on standing at room temperature or at temperatures to which the cellulose ester is subjected either in preparation or use. As a result, the cast film or molded article again becomes brittle and may easily crack or break. Films, lacquers, and molded articles may be subjected to water in their use. If the plasticizer is water soluble to even a small extent, the plasticizer is leached out of the cellulose ester which then becomes hard and brittle. Other properties which may be desired of a plasticizer will depend on the end use of the cellulose ester or ether. Some plasticizers will impart resistance to flammability, cold, oils, greases, and weathering. Some plasticizers discolor badly or oxidize to give off objectionable odors. No one plasticizer seems to be a cure-all for defects in use. This is probably the reason why several hundred plasticizers have been suggested. The majority of them, however, generally fail in one or more of the necessary and desired properties, such as compatibility, low volatility, and water resistance.

The following are typical examples of various commercial plasticizers used for plasticizing cellulose esters and ethers:

Triacetin (glyceryl triacetate)
Dibutyl tartrate
Bis-methoxyethyl adipate
Methoxyethyl oleate
Triphenyl phosphate
Tricresyl phosphate
Methyl phthalyl ethyl glycolate
Dimethyl phthalate
Bis-methoxyethyl phthalate
Bis-butoxyethyl phthalate
Butoxyethyl stearate
Fish oil
Cottonseed oil
Linseed oil
Soybean oil The foregoing esters have not been accepted with complete satisfaction, however, because of their various defects. Triacetin and dibutyl tartrate have poor water resistance. Bis-methoxyethyl adipate is both water sensitive and rather volatile. Methoxyethyl oleate and butoxyethyl stearate seem to be rather volatile and have been found to exude from cellulose acetate films immersed in water. Triphenyl phosphate has poor light stability and is likely to cause discoloration of cellulose acetate and nitrocellulose. Tricresyl phosphate has poor light stability and also has the added defect of being rather toxic, especially if a large portion of the ortho isomer which is believed to be the toxic element is present. Methyl phthalyl ethyl glycolate appears to be rather volatile and water sensitive. It is also incompatible with cellulose acetate of 52% combined acetic acid content. Dimethyl phthalate is rather volatile, and has a tendency at low temperatures to crystallize from films and other articles not only causing embrittlement but also a possibly partially permanent loss of transparency and whitening of the films and finished goods. Bis-methoxyethyl and bis-butoxyethyl phthalate appear to be fairly volatile when used as plasticizers for cellulose esters. Fish and cottonseed oils possess objectionable odors and are likely to become rancid on aging. Vegetable oils, such as linseed and soybean, have limited compatibility in ethyl cellulose and readily exude when more than about 30 to 40% is incorporated as a plasticizer.

It has been found that the foregoing objections have been in a large measure overcome by plasticizing cellulose ester and ether compositions with di-esters of aliphatic monocarboxylic acids of 2 to 18 carbon atoms and 1,4-butanediol or 1,6-hexanediol.

Aliphatic monocarboxylic acid di-esters of 1,4-butanediol and 1,6-hexanediol are readily compatible with the various cellulose esters and ethers and do not exude or show migration of plasticizer on standing when used as plasticizers for cellulose esters and ethers. They impart outstanding flexibility, toughness, resistance to water, dimensional stability in water, etc., to cellulose esters and ethers. They are unaffected by ultraviolet light and do not become discolored on exposure to sunlight. They are stable to heat and show improved resistance to volatilizing from cellulose ester and ether compositions exposed to heat in manufacture or use. They are odorless and do not impart objectionable odors to cellulose ester and ether compositions.

1,4-butanediol, $HOH_2C-CH_2CH_2CH_2OH$, and 1,6-hexanediol, $HOH_2C-CH_2-CH_2-CH_2-CH_2-CH_2OH$, are commercially available products. The former is prepared by catalytic hydrogenation of 2-butyn-1,4-diol which is obtained from the reaction of acetylene with formaldehyde and the latter is obtained from the dimerization of propargyl alcohol, yielding 2,4-hexadiyne-1,6-diol followed by catalytic hydrogenation.

The following are illustrative examples of saturated aliphatic monocarboxylic acids having the general structure, $C_nH_{2n+1}COOH$, which may be employed in esterifying 1,4-butanediol and 1,6-hexanediol to form di-esters suitable as plasticizers for cellulose esters and ethers:

| | |
|---|---|
| Acetic | Caprylic |
| Propionic | Pelargonic |
| Butyric | Capric |
| Valeric | Lauric |
| Caproic | Palmitic |
| Heptylic | Stearic |

Unsaturated acids, such as oleic and ricinoleic acid, may also be employed.

The aliphatic monocarboxylic acids may be used alone or a mixture of two aliphatic monocarboxylic acids may be used to prepare esters useful as plasticizers for cellulose esters and ethers. It is believed that better compatibility and improved physical properties will result from the use of mixed aliphatic monocarboxylic acid di-esters of 1,4-butanediol and of 1,6-hexanediol.

The resulting esters will then have the following general formulae:

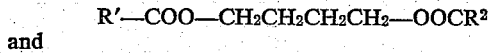

and

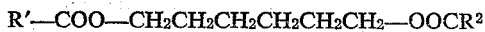

wherein R' is the residue of an aliphatic monocarboxylic acid of from 1 to 11 carbon atoms, and $R^2$ is the residue of an aliphatic monocarboxylic acid ranging from 1 to 17 carbon atoms.

Di-esters of aliphatic $C_{18}$ monocarboxylic acids, such as 1,4-butanediol distearate and 1,4-butanediol dioleate, are compatible with nitrocellulose, ethyl cellulose, etc., but incompatible with celluose acetate and cellulose acetate butyrate when 20% by weight of di-ester is used as a plasticizer.

The following examples will serve to illustrate the process utilized in the preparation of the ester plasticizers. All parts given are by weight unless otherwise specified.

EXAMPLE I

1,6-hexanediol dibutyrate 59 parts of 1,6-hexanediol and 158 parts of pyridine were charged into a 500 ml., 3-necked flask, equipped with stirrer, thermometer, reflux condenser, and dropping funnel, and the mixture heated to reflux. 106 parts of n-butyryl chloride were added dropwise to the refluxing mixture during a period of 1 hour. The stirring was continued for 2 hours after the addition was complete. The reaction mixture was then poured into ice water and concentrated hydrochloric acid added in a sufficient quantity to give a pH of 5. The organic material was extracted with 200 parts of ether and the extract washed with 10% sodium carbonate solution and then with water. After removal of the ether, the ester was distilled as a colorless liquid with a boiling point of 112–114° C. at 2 mm. pressure.

EXAMPLE II

1,6-hexanediol di-2-ethylhexoate 59 parts of 1,6-hexanediol, 144 parts of 2-ethylhexoic acid, and 5 parts of 50% sulfuric acid were charged into a 500 ml. flask, equipped as in Example I. The mixture was refluxed for 2 hours and the water removed as it formed. The refluxing and water removal was continued for an additional 2 hours. The reaction mixture was then washed with 10% aqueous sodium carbonate solution and finally with water. Fractionation yielded the ester product as a light yellow liquid having a boiling point of 157–160° C. at 0.5 mm. pressure.

EXAMPLE III

1,4-butanediol dilaurate 45 parts of 1,4-butanediol, 200 parts of lauric acid, and 3 parts of 50% sulfuric acid were charged into a 500 ml. flask, equipped with stirrer, thermometer, take-off condenser, and inlet for dry, oxygen-free nitrogen. After purging with nitrogen, the reaction mixture was heated at 120–150° C. for 4½ hours. The water as it was formed was removed by distillation. The reaction mixture was then heated in vacuo at 150–200° C. and 1.5 mm. for 1 hour to remove all volatile matter. The non-distilled residue which is the ester is a yellow pasty solid.

EXAMPLE IV

1,4-butanediol diacetate 45 parts of 1,4-butanediol, 102 parts of acetic anhydride, 60 parts of acetic acid (glacial), and 1.5 parts of sodium acetate (anhydrous) were charged into a 500 ml. flask, equipped as in Example I. The mixture was heated at reflux for 4 hours and thereafter heated under reduced pressure to remove the acetic acid. The reaction mixture was then washed with water, dried, and fractionated. The diacetate was obtained as a water-white liquid having a boiling point of 62–65° C. at 1.5 mm. pressure.

EXAMPLE V

1,4-butanediol di-2-ethylhexoate 45 parts of 1,4-butanediol and 158 parts of pyridine were charged into a 500 ml. flask, equipped as in Example I, and the mixture heated to reflux. 162 parts of 2-ethylhexanoyl chloride were added dropwise to the refluxing mixture during 1¼ hours. The reaction mixture was stirred for an additional 2½ hours at room temperature and worked up as in Example I. Fractionation gave a colorless liquid product having a boiling point of 148–152° C. at 0.4 mm. pressure.

EXAMPLE VI

1,4-butanediol acetate stearate 90 parts of 1,4-butanediol and 284 parts of stearic acid were heated at 100–200° C. for 4–5 hours, removing the water by distillation as it was formed. The reaction mixture was cooled to room temperature and 102 parts of acetic anhydride added. The mixture was then heated to 200° C. during 3 hours, distilling off acetic acid and excess acetic anhydride. The mixture was finally vacuum stripped at 150–250° C. and 1–5 mm. to remove any volatiles. The residue was the desired product.

EXAMPLE VII

1,6-hexanediol acetate stearate

Example VI was repeated with the exception that 90 parts of 1,4-butanediol were replaced by 118 parts of 1,6-hexanediol.

The esters prepared above are readily compatible with the cellulose esters and ethers commercially used, such as cellulose acetate, cellulose triacetate, cellulose acetate propionate, cellulose acetate butyrate, cellulose nitrate, cellulose nitrate acetate, ethyl cellulose, benzyl cellulose, and the like. The esters may be incorporated into molding powders of cellulose esters and ethers or into solutions which are normally prepared for films, lacquers, dopes, and laminating solutions. The concentration or amount to be used as a plasticizer will depend on the type of cellulose ester or ether composition and the properties desired of the cellulose ester. The most efficacious amount to be employed for any particular composition can be very readily determined by simple routine spot experiments. In general, however, the amount of plasticizer to add for molding powders may range from 20 to 40% of the powder, in solutions for films anywhere from 5 to 30%, in lacquers about 5 to 50%, in dopes from 10 to 100%, and in laminating solutions from 10 to 30%. All of these percentages are based on the weight of the cellulose ester or ether.

The following examples illustrate the application of the foregoing esters as plasticizers and the improved results obtained thereby when compared with currently used plasticizers.

EXAMPLE VIII

A film of cellulose acetate of 5 mil thickness, containing 58.4 to 59% combined acetic acid, was prepared by casting the composition given below containing various commercial plasticizers on a clean, glass plate with a doctor blade, followed by air drying for 48 hours at room temperature at a controlled rate to prevent blushing of or other physical damage to the film. The film was then removed from the glass plate and further dried for 2 hours at 60° C. in the presence of freely circulating air.

| | Parts |
|---|---|
| Cellulose acetate | 15 |
| Plasticizer | 3 |
| Methylene chloride | 50 |
| Ethylene chloride | 22 |
| Absolute ethanol | 10 |

In like manner, films of the same thickness were prepared in which the plasticizers prepared as described above were substituted for the various commercial plasticizers in the above composition. These films had excellent flexibility, toughness, and clarity.

Samples of all of the films were placed in an air circulating oven for 24 hours at 100° C., following which the per cent weight loss of the films was determined. The superiority of films containing the plasticizers of this invention over similar films containing the various commercial plasticizers in resistance to volatility under the given conditions is shown in Table 1.

TABLE 1

| Plasticizer | Percent Weight Loss of Film After 24 Hours at 100° C. |
|---|---|
| Triacetin | 6.1 |
| Dibutyl tartrate | 7.0 |
| Methoxyethyl oleate | 6.6 |
| Butoxyethyl stearate [1] | 8.6 |
| Bis-methoxyethyl adipate | 9.4 |
| 1,4-Butanediol diphenoxyacetate | 8.7 |
| 1,5-Pentanediol dicyclohexylacetate | 8.5 |
| 1,4-Butanediol diacetate | 5.4 |
| 1,4-Butanediol di-2-ethylhexanoate | 6.2 |
| 1,6-Hexanediol di-2-ethylhexanoate | 5.4 |

[1] Plasticizer not completely compatible.

EXAMPLE IX

In like manner, a 5 mil thick film of cellulose acetate was prepared as given in Example VI in which 1,6-hexanediol dibutyrate was substituted for various commonly used commercial plasticizers in the following composition:

| | Parts |
|---|---|
| Cellulose acetate | 15 |
| Plasticizer | 3 |
| Methylene chloride | 50 |
| Ethylene chloride | 22 |
| Absolute ethanol | 10 |

Samples of all of these films were completely immersed in water at room temperature for 48 hours, removed, rinsed with distilled water, and dried for 2 hours at 60° C. The samples were then weighed, and the per cent weight loss of the films was determined. The results obtained are given in Table 2, which clearly shows the superior resistance of 1,6-hexanediol dibutyrate to the leaching action of water over prior art and various commonly used plasticizers.

TABLE 2

| Plasticizer | Percent Weight Loss of Film After 48 Hours Immersion in Water at Room Temperature |
|---|---|
| Triacetin | 10.2 |
| Dibutyl tartrate | 9.6 |
| Methoxyethyl oleate | [1] 3.0 |
| Butoxyethyl stearate [2] | [1] 5.5 |
| Bis-methoxyethyl adipate | 15.8 |
| Bis-methoxyethyl phthalate | 6.2 |
| 1,4-Butanediol diphenoxyacetate | 5.8 |
| 1,5-Pentanediol dicyclohexylacetate | 6.5 |
| 1,6-Hexanediol dibutyrate | 3.1 |

[1] Plasticizer exuded; film became hazy.
[2] Plasticizer not completely compatible.

EXAMPLE X

A film of cellulose acetate butyrate of 5 mil thickness having an average acetyl content of 30% and butyryl content of 17.5% was prepared by casting the composition given below containing various commonly used commercial plasticizers, on a clean, glass plate with a doctor blade, followed by air drying for 48 hours at room temperature at a controlled rate to prevent blushing of the film. The film was then removed from the glass plate and further dried for 2 hours at 60° C. in the presence of freely circulating air.

| | Parts |
|---|---|
| Cellulose acetate butyrate | 15 |
| Plasticizer | 3 |
| Methylene chloride | 50 |
| Ethylene chloride | 22 |
| Absolute ethanol | 10 |

In like manner, films of the same thickness were prepared in which the plasticizers prepared as described above were substituted for the various commercial plasticizers in the given composition. Films of excellent flexibility, toughness, and clarity were produced.

Samples of all of these films were exposed to freely circulating air in an oven for 24 hours at 100° C. following which the per cent weight was determined. The superiority of films containing the plasticizers of this invention over those containing various prior art and commonly used commercial plasticizers in resistance to weight loss under these conditions is shown in Table 3.

TABLE 3

| Plasticizer | Percent Weight Loss of Film After 24 Hours at 100° C. |
|---|---|
| Triacetin | 9.7 |
| Dibutyl tartrate | 9.8 |
| Methoxyethyl oleate | 9.9 |
| Butoxyethyl stearate [1] | 8.1 |
| Bis-methoxyethyl adipate | 14.5 |
| Bis-butoxyethyl phthalate | 7.8 |
| 1,4-Butanediol Diphenoxyacetate | 7.8 |
| 1,5-Pentanediol dicyclohexylacetate | 8.0 |
| 1,4-Butanediol diacetate | 7.5 |
| 1,4-Butanediol dilaurate | 5.2 |

[1] Plasticizer not completely compatible.

EXAMPLE XI

A film of cellulose acetate butyrate of 5 mil thickness having an average acetyl content of 30% and butyryl content of 17.5% was prepared as given in Example IX containing various commonly used commercial plasticizers from a composition consisting of the following:

| | Parts |
|---|---|
| Cellulose acetate butyrate | 15 |
| Plasticizer | 3 |
| Methylene chloride | 50 |
| Ethylene chloride | 22 |
| Absolute ethanol | 10 |

Similar films were prepared in which the plasticizers of this invention were substituted for the various commercial plasticizers.

Samples of all of these films were completely immersed in water at room temperature for 48 hours, removed, rinsed with distilled water, and dried for 2 hours at 60° C. The samples were then weighed, and the per cent weight loss of the films was determined. The results obtained are given in Table 4 and clearly show the superior resistance of the plasticizers of this invention to the leaching action of water over various prior art and commonly used plasticizers.

TABLE 4

| Plasticizer | Percent Weight Loss of Film After 48 Hours Immersion in Water at Room Temperature |
|---|---|
| Dimethyl phthalate | 2.7 |
| Triacetin | 3.6 |
| Dibutyl tartrate | 3.8 |
| Bis-methoxyethyl adipate | 14.4 |
| Bis-methoxyethyl phthalate | 2.5 |
| 1,4-Butanediol diphenoxyacetate | 3.5 |
| 1,5-Pentanediol dicyclohexylacetate | 3.8 |
| 1,4-Butanediol di-2-ethylhexanoate | 1.2 |
| 1,4-Butanediol dilaurate | 0.7 |
| 1,6-Hexanediol dibutyrate | 2.0 |
| 1,6-Hexanediol di-2-ethylhexanoate | 0.05 |

We claim:

A composition of matter comprising an organic cellulose derivative selected from the class consisting of water-insoluble cellulose esters of lower alkyl monocarboxylic acids and mixtures thereof and water-insoluble cellulose ethers of lower alkyl monohydric alcohols containing, in a plasticizing amount, 1,6-hexanediol di-2-ethylhexoate.

References Cited in the file of this patent

UNITED STATES PATENTS

| | | |
|---|---|---|
| 598,648 | Schupphaus | Feb. 8, 1898 |
| 1,084,702 | Machund | Jan. 20, 1914 |
| 2,017,070 | Lazier | Oct. 15, 1935 |
| 2,129,156 | Trolander | Sept. 6, 1938 |
| 2,341,464 | Meyer | Feb. 8, 1944 |
| 2,549,050 | Brophy et al. | Apr. 17, 1951 |
| 2,578,684 | Filachione | Dec. 18, 1951 |
| 2,592,234 | Bell | Apr. 8, 1952 |

FOREIGN PATENTS

| | | |
|---|---|---|
| 144,030 | Austria | Dec. 27, 1935 |